United States Patent
Borman

[15] 3,662,937

[45] May 16, 1972

[54] MAGNETIC TAPE PRESSURE ROLLER

[72] Inventor: Maynard P. Borman, Falcon Heights, Minn.

[73] Assignee: Minnesota Mining and Manufacturing Company, St. Paul, Minn.

[22] Filed: Mar. 6, 1970

[21] Appl. No.: 17,218

[52] U.S. Cl. ................................226/89, 274/4 C, 226/194, 242/197

[51] Int. Cl. ..........................................................B65h 17/20

[58] Field of Search ................................226/194, 190–193, 226/180, 189, 181, 186, 187; 274/4 C; 242/197

[56] References Cited

UNITED STATES PATENTS

| | | | |
|---|---|---|---|
| 3,507,437 | 4/1970 | Lips | 226/192 X |
| 3,315,859 | 4/1967 | Owen et al. | 226/192 X |
| 3,394,899 | 7/1968 | Schoenmakers | 274/4 C |

*Primary Examiner*—Allen N. Knowles
*Assistant Examiner*—Gene A. Church
*Attorney*—Kinney, Alexander, Sell, Steldt & Delahunt

[57] ABSTRACT

A magnetic tape cartridge including a self-aligning pressure roller comprising a tape engaging member formed with a resilient cylindrical peripheral tape engaging surface and supported for rotation about a fixed point on its axis to permit the roller to align with a rotatable capstan shaft in a recording and/or reproducing machine to uniformly press the length of magnetic tape in the cartridge the peripheral tape engaging surface between, and the capstan shaft.

4 Claims, 4 Drawing Figures

INVENTOR
MAYNARD P. BORMAN
BY Kinney, Alexander, Sell, Steldt & DeLaHunt
ATTORNEYS

MAGNETIC TAPE PRESSURE ROLLER

This application relates to a magnetic tape cartridge including a self-aligning pressure roller for use in combination with a rotatable capstan shaft in a recording and/or reproducing machine to drive the length of magnetic tape in the cartridge along a tape guide path.

In the prior art, rollers provided to press a length of magnetic tape against a drive capstan have generally been supported with their axes normally stationary. Capstan drives have long been utilized in recording and/or reproducing machines to drive a length of magnetic tape past a transducing head at a constant velocity. However, when using such a tape drive the pressure roller must have its axis parallel to the axis of the capstan to uniformly press the tape against the capstan across the width of the tape or the magnetic tape will not be driven uniformly by the capstan and wow and flutter will be produced. This desired uniform pressure has generally been accomplished in the prior art by mounting the capstan and pressure roller on parallel axes on a single support deck of a recording and/or reproducing machine. This requires precise alignment of the capstan and pressure roller supports which requires rigid and precise tolerances. Furthermore, in many applications it has been found advantageous to supply the magnetic tape in a cartridge with the pressure roller carried in the cartridge. In such case it is necessary to control the dimensions in the cartridge and in the machine in order to provide parallelism between the capstan and pressure roller axes. Since this has been a difficult and expensive task, pressure roller assemblies such as those disclosed in U.S. Pat. Nos. 2,998,906; 3,233,807; and 3,289,907 have provided for manual adjustment of the pressure roller support to produce the uniform pressure across the width of the magnetic tape that is desired. However, such assemblies have been generally space-consuming and the adjustment has required some skill. Other pressure roller assemblies such as those disclosed in U.S. Pat. Nos. 2,988,257 and 3,298,583 have inherently provided for correction of misalignment of the pressure roller and capstan in one plane by providing for movement of the pressure roller support to align the axis of the pressure roller in a single plane with respect to the axis of the capstan. However these assemblies do not provide for correction of misalignment in other planes which is necessary to provide the desired parallelism and their utility in correcting misalignment is, therefore, very limited.

The magnetic tape cartridge of the present invention includes a self-aligning pressure roller which is rotatable about a fixed point on its axis. It may rotate about its fixed point to align its periphery with the periphery of a capstan in a recording and/or reproducing machine to uniformly press the length of magnetic tape in the cartridge against the capstan.

In the present invention the pressure roller is formed for use in combination with a rotatable capstan shaft to drive the length of magnetic tape in the cartridge along a tape guide path and comprises a tape engaging member formed with a resilient cylindrical peripheral tape engaging surface and means for supporting the tape engaging member for rotation about a fixed point on its axis with the cylindrical tape engaging surface of the tape engaging member tangent to a portion of the tape guide path and the fixed point generally aligned with the centerline of the length of magnetic tape along the tangent portion of the guide path.

The above and further novel features and advantages of the present invention will become apparent after reading the following detailed description which refers to the accompanying drawings, wherein.

Figure 3:
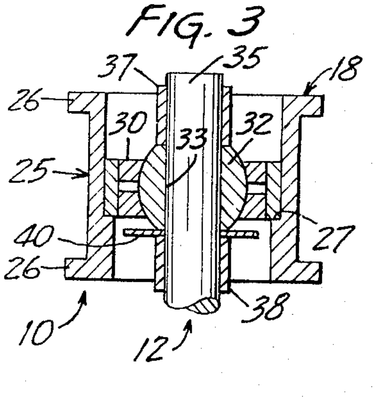
FIG. 3 is a cross-sectional view taken along the line 3—3 of FIG. 1 illustrating a tape guide roller.

A tape guide roller 18 is shown in section in FIG. 3 and since it is representative of the construction of the other tape guide rollers 14, 16 and 20 it will be the only one described in detail. A tape engaging member 10 of the tape guide 18 comprises a generally hollow plastic cylinder 25 formed with spaced parallel flanges 26. The flanges 26 are spaced a distance slightly greater than the width of the length of the magnetic tape 28 to be used and the space between the flanges forms a cylindrical peripheral tape engaging surface for supporting and guiding the length of magnetic tape 28. The tape engaging member 10 also includes a ball bearing race 30 in which is captured a generally spherical steel ball 32. The interior surface of the race 30 is formed complementary to the generally spherical support surface of the ball 32 to permit the race 30 to pivot about the center of the ball 32. The race 30 has an outer diameter equal to the inner diameter of the cylindrical member 25 and it is pressed into the cylindrical member to support the tape engaging member 10 on the ball 32. The generally cylindrical member 25 is formed interiorly with a step 27 to provide precise location of the race 30 as it is pressed into the cylindrical member 25 to assure that the center of the ball 32 will lie on a plane that extends parallel to the flanges 26 midway between them to generally align the center of the ball with the centerline of a length of magnetic tape 28 moving around the guide roller 18.

The steel ball 32 is formed with a central aperture 33 into which a shaft 35 is pressed to support the ball 32 and thereby the tape engaging member 10 to permit the tape engaging member 10 to rotate about the center of the ball 32. A pair of sleeves 37 and 38 are pressed onto the shaft 35 one to either side of the ball and a washer 40 is positioned between one of the sleeves 38 and the surface of the ball 32. The washer 40 serves to limit the pivotal movement of the tape engaging member 10 about the center of the ball 32.

Figure 4:
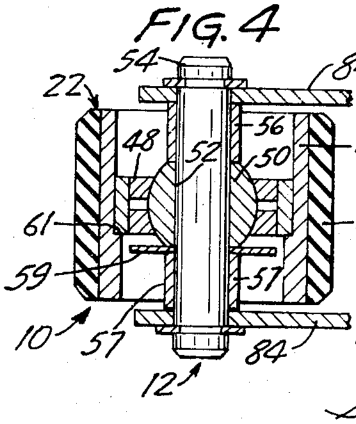
FIG. 4 is a cross-sectional view taken along line 4—4 of FIG. 1 illustrating a pressure roller.

A pressure roller 22 is shown in section in FIG. 4. The tape engaging member 10 of the pressure roller 22 comprises a hollow cylinder 42. The cylinder 42 is formed of metal and the tape engaging member 10 includes a resilient material 44 bonded to the exterior surface of the cylinder 42 to define a resilient cylindrical peripheral tape engaging surface. The pressure roller 22 includes a ball bearing race 48 in which is captured a generally spherical steel ball 50. The ball 50 is formed with a central aperture 52 into which a shaft 54 is pressed, sleeves 56 and 57 are pressed onto the shaft one to either side of the ball and a washer 59 is captured between the sleeve 57 and the ball to limit the pivotal movement of the tape engaging member 10; all these parts being formed like and serving the same function as like parts already described for the guide roller 18. The generally hollow cylinder 42 of the pressure roller 22 is formed interiorly with a shoulder 61 against which the race 48 is pressed to precisely locate the steel ball 50 to assure that the center of the ball 50 will lie in a plane that extends perpendicular to the peripheral surface of the pressure roller 22 midway of its height to align the center of the ball with the centerline of a length of magnetic tape 28 moving past the pressure roller 22.

Figure 1:
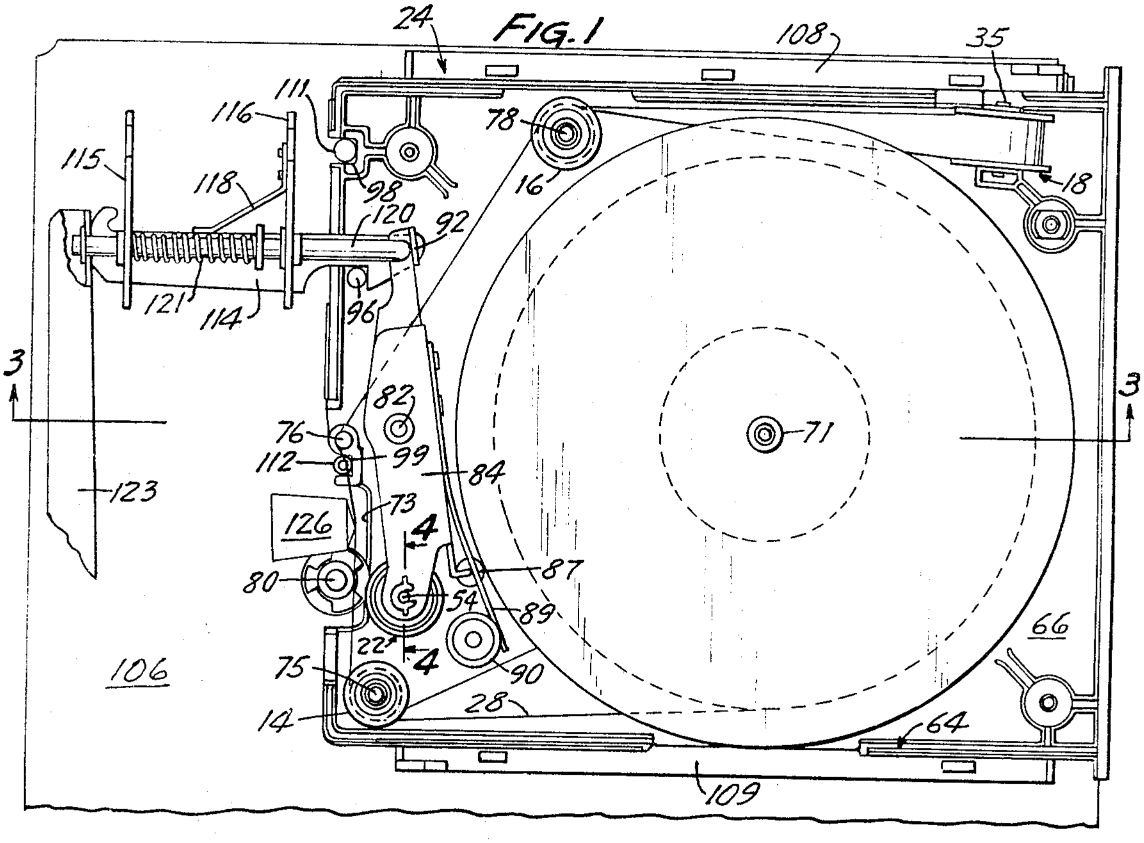
FIG. 1 is a plan view of a magnetic tape cartridge constructed in accordance with the present invention positioned on a recording and/or reproducing machine.
Figure 2:
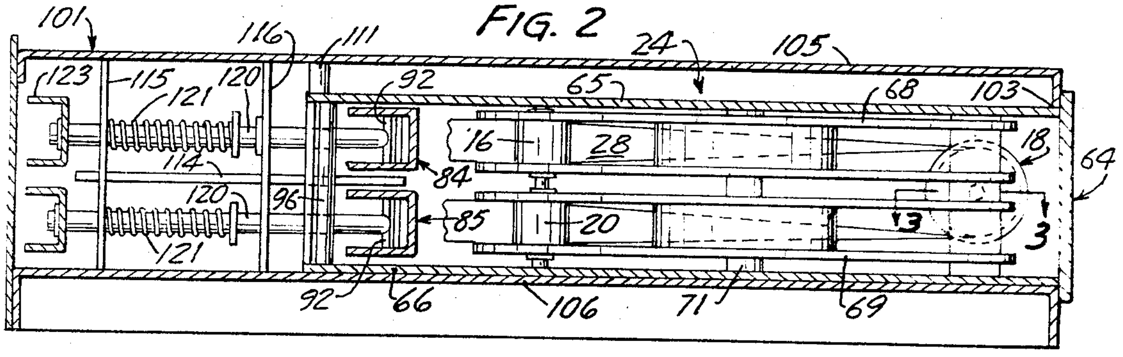
FIG. 2 is a longitudinal cross-sectional view taken generally along line 2—2 of FIG. 1.

Referring now to FIGS. 1 and 2 there is illustrated a magnetic tape cartridge 24 constructed in accordance with the present invention utilizing a pair of pressure rollers. The cartridge 24 comprises a boxlike container 64 made of a molded polymeric material and comprising an upper shell 65 and a lower shell 66 secured together by suitable fasteners. The shells 65 and 66 enclose a pair of similar reels 68 and 69 rotatably supported in axially aligned position generally centrally of the container 64 on a stationary support shaft 71. The upper and lower shells 65 and 66 are formed with similar rectangular side and edge wall openings forming a rectangular recessed opening or cutaway portion 73 in one edge of the cartridge 24 to expose the tape and the tape path to be hereinafter described. The length of magnetic tape 28 is wound on each of the reels 68 and 69 in the same direction; the tape, as viewed in FIG. 1, being wound clockwise around the inner hub of each reel toward the periphery. The tape guides are provided to define a tape path from one reel along one edge of the container 64 across the cutaway portion 73 and back across the cutaway portion to the other reel. The tape path extends from the upper reel 68 around the first guide roller 14 which is rotatably and pivotably mounted on a support shaft 75 that is stationarily supported by the upper and lower shells 65 and 66 of the container 64. The first guide roller 14 is positioned on one side of the cutaway portion 73 and the tape path extends therefrom across the cutaway portion 73 of the container 64, around a stationary guide pin 76 positioned on the opposite side of the cutaway portion 73 from the first roller 14, around the second guide roller 16 which is rotatably and pivotably mounted on a support shaft 78, and to the third guide roller 18. Guide roller support shafts 75 and 78 and stationary guide pin 76 are positioned with their axes parallel to the axis of the reels 68 and 69 while the third guide roller 18 is journalled about an axis normal to the axis of the reels. The tape 28 in traversing the third guide roller 18 is turned 180° and returns from the lower side of the roller 18, around the fourth guide roller 20 which is rotatably and pivotably mounted on shaft 78 below the second guide roller 16, around the stationary guide pin 76 spaced below the first pass across that pin; around a fifth guide roller (not shown) which is rotatably and pivotably mounted on support shaft 75 below the first guide roller 14, and onto the lower reel 69.

The cartridge 24 is provided with a tape guide and reel brake assembly that supports the pressure rollers 22 which cooperate with a capstan 80 to advance the tape 28. The tape guide and reel brake assembly is supported by a pin 82 mounted between the upper and lower shells 65 and 66 and positioned midway of the width of the container 64 between the tape guide pin 76 and the peripheries of reels 68 and 69 with its axis parallel to the axis of the reels. The tape guide and reel brake assembly comprises similar upper and lower reel brake and pressure roller subassemblies which have channel shaped bodies 84 and 85 rotatably mounted on support pin 82 generally midway of their lengths with their channel openings facing the edge of the container 64 having the cutaway portion 73. As viewed in FIG. 2, the height of the subassembly bodies 84 and 85 are generally equal to the thickness of reels 68 and 69 and serve to guide the tape between pin 76 and the second and fourth guide pulleys 16 and 20. The subassembly bodies 84 and 85 have one end extending across the cutaway portion 73 to each support a pressure roller 22 rotatably and pivotably mounted on a support shaft 54 which extends between the flanges of the associated channel shaped body 84 or 85. The closed wall of each channel adjacent a pressure roller 22 is turned toward the reels 68 and 69 and supports a cylindrical friction brake 87 aligned with one flange of the associated reel. The positions of the pressure roller support pins 54 and friction brakes 87 on the subassembly bodies 84 and 85 are adjusted such that when the friction brakes 87 contact the peripheries of the reels 68 and 69 the pressure rollers 22 are within the container 64 adjacent the cutaway portion 73. Leaf springs 89 are secured to the vertical walls of the subassembly bodies 84 and 85 and extend beyond the pressure rollers 22 and are loaded by a pin 90 extending between the upper and lower shells 65 and 66 to bias the friction brakes 87 into engagement with the peripheries of the reels 68 and 69 and the pressure rollers 22 away from the capstan 80.

At the end of the subassembly bodies 85 and 84 which extend away from the cutaway portion 73 of the container 64 a major portion of the upper flanges and closed walls of the channels are removed forming the tape path, except for vertical tabs 92 on the remote ends thereof. The container 64 is formed with an oblong opening (not shown) aligned with the vertical tabs 92 through which a pair of brake release and pressure roller activating rods 120 may extend to engage the tabs 92 as will be hereinafter described.

A cartridge locking post 96 is supported by the upper and lower cartridge shells 65 and 66 to the side of oblong opening nearer the cutaway portion 73. Openings connecting pairs of opposed small rectangular recesses 98 and 99 are formed in the container 64 in the same edge as cutaway portion 73, one pair to each side of the locking pin 96 and generally equidistant therefrom. The recesses 99, nearer the cutaway portion 73, are between tape guide pin 76 and the cutaway portion 73. A narrow cartridge locking arm slot (not shown) is formed in the center of the edge wall and extends from the opening by the rectangular recesses 98 to a point adjacent the cartridge locking post 96. The function of the locking post 96, the rectangular recesses 98 and 99, and the cartridge locking arm slot will all be hereinafter described.

The recording apparatus cabinet 101 has a rectangular opening 103 between upper and lower support decks 105 and 106 having generally the same dimensions as the container edge wall in which the cutaway portion 73 is formed. Within the cabinet two vertical walls 108 and 109, one on either side of opening 103, guide the cartridge as it is pushed through opening 103 along the lower support deck 106 until the cartridge is positioned as shown in FIG. 1.

Two cartridge positioning pins 111 and 112 are supported between the support decks 105 and 106 and positioned to fit within the small rectangular recesses 98 and 99 in the cartridge edge wall. The positioning pin 112 that fits within recess 99 is formed with smaller diameter portions in the two areas in which the tape path crosses it to further guide the tape 28. A cartridge locking arm 114 is movably supported generally midway of the height of a pair of brackets 115 and 116 extending between support decks 105 and 106 to pass through the narrow locking arm slot in the container edge wall. This arm 114 has a curved end extending into the cartridge and is formed with a hook along one edge which engages cartridge locking post 96. It is biased by a leaf spring 118 toward locking post 96 so that as the cartridge 24 is inserted into the apparatus the locking post 96 first contacts the curved end of the locking arm 114. Further movement of the cartridge then moves the locking arm 114 against the bias of leaf spring 118 until the locking post 96 passes the hook which is then forced into engagement with the post 96 by the leaf spring 118. A cartridge locking lever (not shown) is supported at the front of the apparatus and is connected by appropriate linkages to the locking arm 114 such that movement of the lever draws the hook in locking arm 114 securely against locking post 96 and moves the arm 114 rearwardly pulling the rectangular recesses 98 and 99 in the container edge wall snugly against cartridge positioning pins 111 and 112 to positively position the cartridge 24 in the apparatus.

A pair of brake release and pressure roller activating rods 120 are slidably supported by brackets 115 and 116, one above and one below cartridge locking arm 114. These rods 120 are positioned to extend through the oblong opening in the container edge wall such that each rod contacts one of the vertical tabs 92 at the ends of the brake release and pressure roller subassemblies when the cartridge 24 is locked in the apparatus. Each rod is biased by a spring 121 toward the cartridge 24 to rotate the brake subassembly bodies 84 and 85 about their support pin 82 and thereby to release the brakes 87 from the reels and press the pressure rollers 22 against the capstan 80. The ends of the brake release rods 120 which extend away from the cartridge 24 are restrained, each at one end of one of a pair of long channel shaped arms 123 and 124. These arms 123 and 124 are rotatably mounted one above the other. With the cartridge locked in position and the apparatus 111 in the "off" position the arms 123 and 124 are positioned with the brake release rods 120 held against the force of springs 121 so that they contact the vertical tabs 92 without releasing the reel brakes 87 (as illustrated in FIG. 1).

With the cartridge 24 in position locked in the apparatus the tape 28 is in position for movement past a pickup and/or record means such as a magnetic head 126 by a uniform speed driving means such as capstan 80. The apparatus is placed in the "on" position, the reel brakes 87 are released and one pressure roller 22 presses the tape 28 against the capstan 80. The "on" switch also effects the energization of the capstan 80 to move the tape past the magnetic head 126 and energizes the magnetic head and speaker circuitry for reproducing the signals carried by the tape 28.

Activation of the "on" switch energizes a drive motor (not shown) which drives the capstan 80 at a uniform speed. The capstan 80 is positioned to be received in the cutaway portion 73 of the container 64 on one side of the tape path opposite the pressure rollers 22. The capstan 80 provides for movement of the tape 28 along the tape path and is driven continuously in one direction when the apparatus is in the "on" mode.

As the drive motor is energized, the brake release rods 120, through appropriate linkages, are permitted to be moved by springs 121 against the vertical tabs 92 of the brake subassembly bodies 84 and 85. Movement of the release rods 120 rotates the channel shaped arms 123 and 124 until each arm rests against one of a pair of similar cams (not shown). These cams are 90° out of phase such that one arm is supported to permit its associated release rod 120 to rotate the associated brake subassembly an extent sufficient to disengage the friction brake 87 from the periphery of a reel and to move a pressure roller 22 to press the tape 28 against the capstan 80, while the other arm is supported to permit its associated release rod 120 to rotate the associated brake subassembly an extent just sufficient to disengage the friction brake 87.

Since the pressure rollers 22 are rotatable and pivotable about a fixed point on their respective axes (the center of the associated steel ball 50) they may freely pivot about their respective fixed support points within the limits set by their associated stop washers 59. As the one pressure roller 22 is moved to press the tape 28 against the capstan 80 its support shaft 54 may not have its axis parallel to the axis of the capstan 80 due to misalignment of the upper and lower shells 65 and 66 of the container, the reel brake assembly support pin 22, and/or the support shaft 54 itself. However, as the tape engaging surface 44 of the pressure roller 22 engages the tape 22 against the capstan 80 the rigidity of the capstan causes the tape engaging member 10 of the pressure roller 22 to rotate about its fixed point. Thus, the pressure exerted between the capstan 80 and the pressure roller 22 to drive the tape 28 brings the axis of rotation of the tape engaging member 10 into parallelism with the axis of the capstan 80 as desired to uniformly drive the tape.

As the tape 28 is driven past the magnetic head 126 it is primarily guided into proper contact with the magnetic head 126 by the reduced diameter portions of the stationary cartridge locating and tape guide pin 112 precisely positioned in the machine with respect to the magnetic head 126. The provision of guide rollers 14, 16 and 20 that are rotatable and pivotable about a fixed point to both sides of this primary guide 112 when the cartridge 24 is positioned in the machine permits the precisely located stationary guide 112 to properly guide the tape 28 past the magnetic head 126 even if the guide rollers are not vertically aligned with the reduced diameter portions of the stationary guide 112. To accommodate any misalignment the tape engaging member 10 of these guide rollers may pivot about its fixed support point (the center of the associated steel ball 32) to prevent edge wear or stretching of the tape 28. The provision of a turnaround guide roller 18 that is rotatable and pivotable about a fixed point permits differences in tension in the opposed longitudinal edges of the magnetic tape as it makes the 180° turn around the roller to pivot the guide roller 18 to equalize the tension across the width of the tape. This aids in preventing stretching of the tape and wear of the edges of the tape against the flanges 26 of the guide roller 18.

To reverse the direction of movement of the tape the support arm 123 or 124 associated with the pressure roller 22 in contact with the capstan 80, is rotated about its support shaft to withdraw its release rod 120 from the cartridge 24 an amount sufficient to disengage the pressure roller from the capstan 80 without engaging the associated friction brake 87 against a reel. At the same time the other support arm is permitted to rotate about its support shaft under the force of a brake release rod spring 121 thereby permitting its associated brake release rod 120 to move further into the cartridge 24 an amount sufficient to press the previously unengaged pressure roller 22 against the capstan 80. The tape 28 is then uniformly driven in the opposite direction along the tape path.

Having thus described the present invention

What is claimed is:

1. A cartridge for supplying a length of magnetic tape to a recording and/or reproducing machine comprising:
   - a container formed of shell means defining a boxlike enclosure with a cutaway portion along one edge,
   - means defining a tape guide path in said container across said cutaway portion,
   - a length of magnetic tape extending along said tape guide path, and
   - a self-aligning pressure roller comprising a tape engaging member having a cylindrical peripheral tape engaging surface of a resilient material, and means for supporting said tape engaging member within said container for rotation about a fixed point on its axis and for pivotal movement of its axis about said fixed point in all planes containing its axis with said cylindrical tape engaging surface of said member tangent to a portion of said tape guide path across said cutaway portion and said fixed point generally aligned with the centerline of a said length of magnetic tape along said tangent portion of said guide path.

2. The tape cartridge of claim 1, wherein said means for supporting said tape engaging member is supported by said shell means for movement to move said pressure roller toward and away from said tangent portion of said tape guide path to engage and disengage said pressure roller and said magnetic tape.

3. A magnetic tape cartridge as recited in claim 1, wherein said means for supporting said tape engaging member includes a stationary generally spherical support surface with its center at said fixed point and wherein said tape engaging member is internally formed for support and rotation upon said support surface and pivotal movement about said fixed point.

4. A magnetic tape cartridge as recited in claim 3, wherein said tape engaging member comprises a generally hollow cylinder, wherein said support surface is defined by a spherical ball formed with a central aperture, and wherein said means for supporting said tape engaging member further includes a stationary shaft supported generally parallel to said tangent portion of said tape guide path and extending into said aperture in said spherical ball to rotatably support said tape engaging member.

* * * * *

UNITED STATES PATENT OFFICE
CERTIFICATE OF CORRECTION

Patent No. 3,662,937 Dated May 16, 1972

Inventor(s) Maynard P. Borman

It is certified that error appears in the above-identified patent and that said Letters Patent are hereby corrected as shown below:

In the Title

Delete "Pressure Roller" and insert in its place -- Cartridge --.

In the Abstract of the Disclosure

Line 7, after "cartridge" insert -- between --;

Line 8, delete "between,".

In the Specification

Column 3, line 63, change "85 and 84" to -- 84 and 85 --.

Signed and sealed this 3rd day of October 1972.

(SEAL)
Attest:

EDWARD M. FLETCHER, JR.
Attesting Officer

ROBERT GOTTSCHALK
Commissioner of Patents